Nov. 27, 1945.   S. TAYLOR   2,389,700
FAN ATTACHMENT
Filed Oct. 11, 1944

Inventor
Shepard Taylor,

Patented Nov. 27, 1945

2,389,700

UNITED STATES PATENT OFFICE 2,389,700

FAN ATTACHMENT

Shepard Taylor, Gresham, S. C.

Application October 11, 1944, Serial No. 558,175

2 Claims. (Cl. 230—241)

This invention relates to new and useful improvements in fan attachments for plows, cultivators and other agricultural implements.

An important object of the invention is to provide a fan attachment for agricultural implements intended to fan and make more comfortable the farmer while engaged in plowing or cultivating.

Another important object of the invention is to provide an attachment of the character stated which can be readily applied and removed with respect to the handle portions of an agricultural implement.

Various other important objects and advantages of the invention shall become apparent to the reader of the following description.

In the drawing.

Referring to the drawing wherein like numerals designate like parts, it can be seen that reference character A denotes one handle of a plow or cultivator implement.

Figure 1:
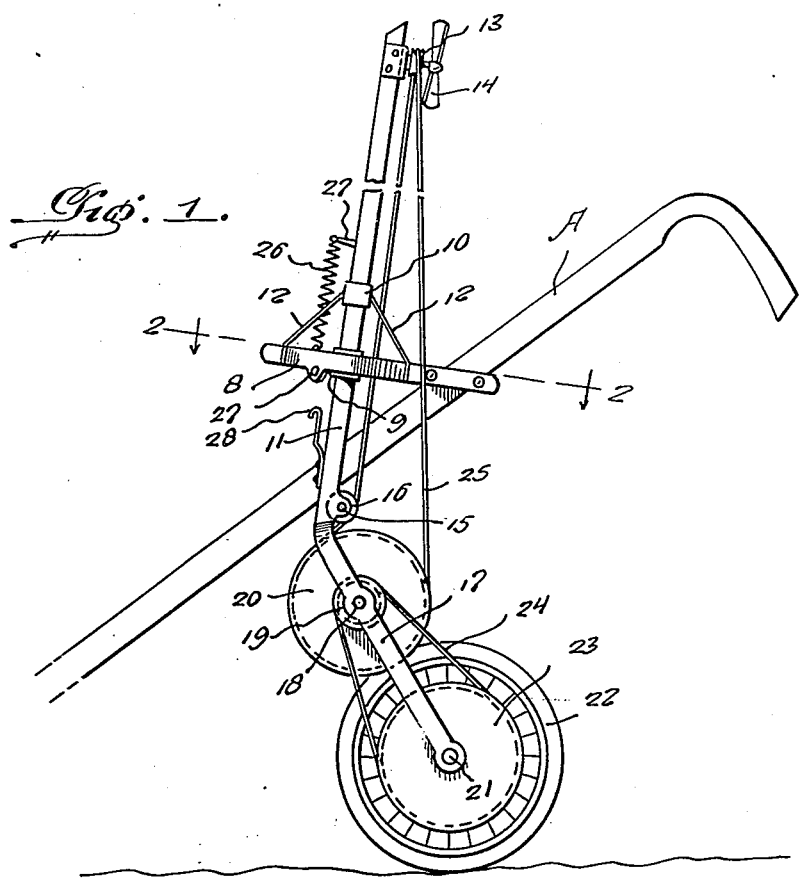
Figure 1 is a fragmentary side elevational view showing the present invention installed.
Figure 2:
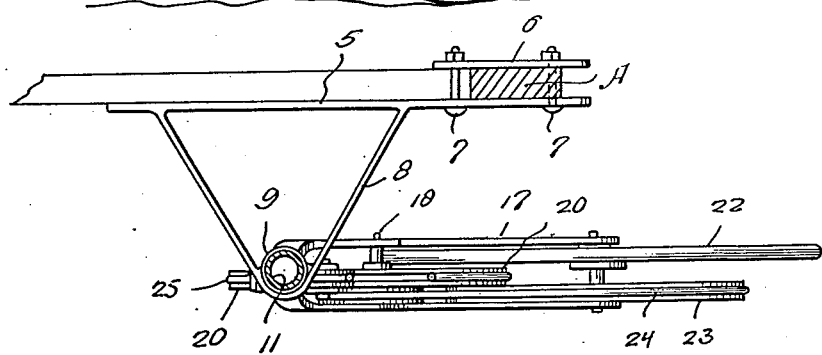
Figure 2 is a fragmentary horizontal sectional view taken on the line 2—2 of Figure 1.

In carrying out the present invention a bracket is employed, the same consisting of a bar 5 having a clamp plate 6, with bolts 7, 7 passing through this clamp plate 6 and the adjacent portion of the bar 5 for securing the bracket to the implement handle A.

A substantially V-shaped horizontally disposed frame 8 projects from the bar 5 to a point between the handle A and the usual complement handle (not shown) of an agricultural implement.

The outer portion of the frame 8 has a collar 9 welded in the crotch portion thereof and vertically slidable through the collar 9 and an elevated collar 10 is a post 11, it being observed that brace members 12 serve to support the collar 10.

At the upper portion of the post 11 is a rearwardly projecting shaft having a pulley 13 thereon and also a fan 14. Between a pair of ears 15 on the lower portion of the post 11 is mounted a pulley 16 and from this lower end of the post 11 an oblique fork 17 projects, this fork 17 supporting a shaft 18 on which is a small pulley 19 and a large pulley 20. Between lower ends of the fork 17 is a shaft 21 carrying a ground riding wheel 2 and a large pulley 23.

A belt 24 is trained over the pulleys 23, 19 and a second belt 25 is trained over the pulleys 13 and 20 and against the small pulley 16.

A tension spring 26 is interposed between an anchor 27 on the post 11 and the frame 8 for maintaining the post urged downwardly with the wheel 22 in ground riding position.

The frame 8 has an eye 27 with which a hook 28 on the post 11 is engageable when the post is raised to a position elevating the wheel 22 above the ground, as when it is desired to inactivate the attachment.

It can now be seen, that when the hook 28 is disengaged and the spring 26 is urging the post 11 downwardly, the wheel 22 is riding the ground and through the pulley 23, belt 24, pulley 19, pulley 20, belt 25 and pulley 13 is driving the fan 14. The fan in rotating will drive air rearwardly on to the body of the farmer or whoever is holding the handles of the implement.

When it is desired to make the device inactive, the post 11 can be elevated and the hook 28 engaged with the eye 27, thus maintaining the wheel 22 elevated above the ground.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

1. In combination with a handle of an agricultural implement, a detachable cooling fan, ground engaging means for driving the fan, and means for elevating and holding the ground engaging means above the ground in inoperative position.

2. In combination with a handle of an agricultural implement, a detachable cooling fan, ground engaging means for driving the fan, means for elevating and holding the ground engaging means above the ground, said means comprising a handle attachable frame, an upright slidable through the frame, spring means for urging the upright downwardly, said ground engaging means being carried by the upright, and hook and eye means between the upright and the frame for holding the upright elevated along with the ground engaging means.

SHEPARD TAYLOR.